(12) United States Patent
Lemaire et al.

(10) Patent No.: US 6,499,318 B1
(45) Date of Patent: Dec. 31, 2002

(54) GLASS OPTICAL WAVEGUIDES PASSIVATED AGAINST HYDROGEN-INDUCED LOSS INCREASES

(75) Inventors: Paul Joseph Lemaire, Madison, NJ (US); Kenneth Lee Walker, New Providence, NJ (US)

(73) Assignee: Fitel USA Corp., Norcross, GA (US)

( * ) Notice: Subject to any disclaimer, the term of this patent is extended or adjusted under 35 U.S.C. 154(b) by 1341 days.

(21) Appl. No.: 08/897,873

(22) Filed: Jul. 21, 1997

Related U.S. Application Data

(63) Continuation of application No. 08/548,356, filed on Nov. 1, 1995, now abandoned, which is a continuation-in-part of application No. 08/217,039, filed on Mar. 24, 1994.

(51) Int. Cl.[7] ............................................. C03B 37/00
(52) U.S. Cl. ............................. 65/379; 65/384; 65/390; 65/426
(58) Field of Search .......................... 65/426, 379, 389, 65/390

(56) References Cited

U.S. PATENT DOCUMENTS

| | | |
|---|---|---|
| 3,791,714 A | 2/1974 | Maurer et al. ............... 350/96 |
| 4,389,230 A | 6/1983 | Modone et al. .............. 65/3.12 |
| 4,515,612 A | 5/1985 | Burrus, Jr. et al. ............ 65/2 |
| 4,623,373 A | 11/1986 | Stone ............................ 65/2 |
| 4,685,945 A | 8/1987 | Freund ....................... 65/4.21 |
| 5,000,541 A | 3/1991 | DiMarcello et al. ........ 350/96.3 |
| 5,059,229 A | 10/1991 | Blankenship et al. ............ 65/2 |

OTHER PUBLICATIONS

P. J. Lemaire, et al. "Prediction of Long–Term Hydrogen–Induced Loss Increases in Er–Doped Amplifier Fibers", *IEEE Photonics Technol. Letters*, vol. 5, No. 2, p. 214 (1993).

C. M. Hartwig, "Raman scattering from hydrogen and deuterium dissolved in silica as a function of pressure", *J. of Appl. Phys.* vol. 47, No. 3, p. 956 (1976).

J. E. Shelby, et al. "Radiation–induced isotope exchange in vitreous silica", *J. Appl. Phys.* vol. 50, No. 8, p. 5533 (1979).

*Primary Examiner*—John Hoffmann
(74) *Attorney, Agent, or Firm*—Lowenstein Sandler PC

(57) ABSTRACT

Applicants have discovered that glass optical waveguides subject to hydrogen-induced loss increases can be passivated by treating the glass with deuterium. The deuterium-treated glass not only exhibits a lower rate of loss increase when later exposed to environments containing $H_2$, but also retains high transmission of light in the 1.55 and 1.31 micrometer wavelength regions immediately after the deuterium heat treatment. The method applies to Er-doped fiber, transmission fiber and planar waveguides. Under some circumstances, hydrogen can be substituted for deuterium.

10 Claims, 2 Drawing Sheets

GLASS OPTICAL WAVEGUIDES PASSIVATED AGAINST HYDROGEN-INDUCED LOSS INCREASES

CROSS-REFERENCE TO RELATED APPLICATION

This application is a continuation of application Ser. No. 08/548,356, filed Nov. 1, 1995, a continuation-in-part of application Ser. No. 08/217,039, filed Mar. 24, 1994.

FIELD OF THE INVENTION

This invention relates to glass optical waveguides such as optical fibers and planar waveguides and, in particular, to such waveguides passivated against hydrogen-induced loss increases.

BACKGROUND OF THE INVENTION

While optical waveguides, such as optical fibers, can carry optical signals over remarkably long distances between repeater stations, it has been observed that such fibers suffer long-term increases in loss, particularly for transmission of light in the 1.55 and 1.31 micrometer wavelength regions. One type of loss increase is attributed to the reaction of hydrogen with defects in $GeO_2$-doped waveguides containing alkali impurities such as Na and Li. Another type occurs when $H_2$ reacts at defect sites in undoped silica areas. The rate of loss increase of the latter type can be reduced by treating the fiber with hydrogen during the draw process (U.S. Pat. No. 5,059,229 issued to M. G. Blankenship et al. on Oct. 22, 1991). But this rate reduction is obtained only at the cost of increased loss at the outset. Such increased loss is undesirable for many high performance applications such as long distance transmission.

Hydrogen-induced loss is particularly a problem in erbium-doped (Er-doped) amplifier fibers. Accelerated hydrogen aging tests have shown that Er-doped amplifier fibers react quickly with even trace levels of $H_2$, causing spectrally broad loss increases that can influence signal and pump wavelengths. See P. J. Lemaire et al., Prediction of Long-Term Hydrogen-Induced Loss Increases in Er-Doped Amplifier Fibers, 5 *IEEE Photonics Technology Letters* 214 (Febrary 1993) and P. J. Lemaire et al., Hydrogen-induced loss increases in erbium-doped amplifier fibers: Revised Predictions *OFC Technical Digest* Feb. 20–25 (1994), Paper FF1. U.S. Pat. No. 4,685,945 to Friedemann Freund describes a method of enhancing long-term stability in high purity vitreous silica optical fiber by permeating deuterium molecules into the fiber and then propagating through the fiber high intensity light with a wavelength less than about 650 manometers. The difficulty with this process is most useful fibers absorb heavily at such short wavelengths, making uniform treatment difficult. Accordingly, there is a need for improved glass waveguides passivated against hydrogen-induced loss increases.

SUMMARY OF THE INVENTION

Applicants have discovered that glass optical waveguides subject to hydrogen-induced loss increases can be passivated by treating the glass with deuterium. The deuterium-treated glass not only exhibits a lower rate of loss increase when later exposed to environments containing $H_2$, but also retains high transmission of light in the 1.55 and 1.31 micrometer wavelength regions immediately after the deuterium heat treatment. The method applies to Er-doped fiber, transmission fiber and planar waveguides. Under some circumstances, hydrogen can be substituted for deuterium.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

This description is divided into three parts. Part I describes the preferred method of passivation by treatment with deuterium. Part II describes the circumstances in which hydrogen can be substituted for deuterium, and Part III sets forth a theoretical physical model providing for extension of the results described herein.

I. Deuteriwn Passivation

Essentially, a glass optical waveguide is passivated against hydrogen-induced loss by forming the waveguide and, before hydrogen can react with low activation energy defect sites, heating the waveguide in the presence of deuterium (D) so that deuterium occupies the highly reactive low energy sites rather than hydrogen (H). Because deuterium has greater mass than hydrogen, OD absorbs at longer wavelengths than OH. Specifically, OD has very low absorption at the 1.55 and 1.31 micrometer wavelength regions of interest.

Figure 1:
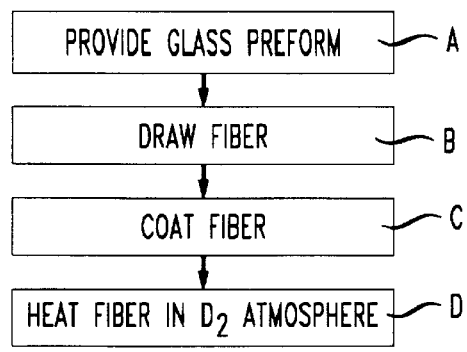
FIG. 1 is a block diagram of the steps in a preferred method of passivating a glass optical fiber against hydrogen-induced loss increases.

Referring to the drawings, FIG. 1 is a block diagram of the steps in a referred method for passivating a typical glass optical fiber against hydrogen-induced loss increases. As shown in block A of FIG. 1, the first step is to provide a suitable preform for drawing optical fiber. In accordance with conventional practice, the preform typically comprises a composite glass rod having a central core region which can be $GeO_2$ doped silica and a concentric outer cladding of silica. For typical Er-doped fiber the core is doped with about 14–18 mole % $GeO_2$, about 1.0 mole % $Al_2O_3$, and 100–2000 ppm of Er.

The next step, shown in block B, is drawing fiber from the preform. The Er-doped fiber is typically drawn to a 2.5–4.5 micrometer core diameter in accordance with techniques well known in the art.

As shown in block C, the third step —which is also conventional —is to coat the fiber with protective polymer. Typical polymers are urethane-acrylate coatings. The coatings are typically applied and cured with ultraviolet light as the fiber is drawn in a continuous process.

The next step, shown in block D, is to dispose the fiber in an atmosphere comprising deuterium and to subject it to heat. This step preferably begins shortly after the fiber is formed and before the fiber is used in a hydrogen-containing environment. This step can be conveniently performed by heating spooled, polymer-coated fiber in a deuterium-filled oven. The preferred heating time for passivation depends on the temperature, the partial pressure of deuterium, and the application for which the fiber is intended. Preferred temperatures are 140° C. or below in order to avoid damage to the polymer coating, but with high temperature coatings, temperatures up to about 200° C. can be used. Temperatures in excess of 200° C. are not recommended as such temperatures in $GeO_2$ doped waveguides will cause new types of absorption losses (electronic). The preferred deuterium partial pressure is less than 10 atmospheres and advantageously is one atmosphere in order to avoid the use of expensive pressure vessels; however, higher pressures up to 100 atm. can be used if it is desired to minimize passivation time. Applicants' process, unlike the Freund '945 process, does not require exposing the fiber to high intensity, short wavelength light.

Table 1 below illustrates preferred treatment for fibers expected to tolerate the indicated 1.55 micrometer loss for a 20 m fiber over a period of 25 years.

| Operating Conditions | | Passivation Conditions | | |
|---|---|---|---|---|
| Temperature, Partial Pressure $H_2$ | Tolerable 1.55 μm Loss Change | Partial Pressure $D_2$ | Treatment Temperature | Treatment Time |
| 75° C., $P_{H2}$ = 0.01 atm. | 0.1 dB | 1 atm | 125° C. | 8 days |
| 40° C., $P_{H2}$ = 0.01 atm | 0.1 dB | 1 atm | 60° C. | 12 hrs. |
| 25° C., $P_{H2}$ = 0.01 atm | 0.04 dB | 1 atm | 60° C. | 17 hrs. |

The same process with different passivation conditions can be applied to optical transmission fibers. Such fibers are typically drawn of preforms with $GeO_2$-doped glass cores and cladding layers composed of either undoped $SiO_2$ or $SiO_2$ doped with some combination of F, $GeO_2$ and $P_2O_5$ dopants. Such fibers can also contain alkali species, (e.g., Na, Li, and K) which introduce reactive defect sites prone to reacting with trace levels of $H_2$ impurities. These hydrogen reactions cause OH overtone loss increases in the 1.41 micrometer region along with a long wavelength loss edge. Experiments show that the reactive defect sites have a range of activation energies. The sites with the lowest activation energies are responsible for long term hydrogen-induced loss increases. By pre-reacting these sites with deuterium, it is possible to avoid further loss degradation at system operating conditions. Moreover, by using $D_2$ instead of $H_2$ for the passivation, the fiber can be passivated without incurring any significant loss degradation in the 1.55 micrometer region.

Table II below illustrates preferred treatment for single mode optical transmission fibers expected to tolerate loss increases of no more than 0.002 dB/km at 1.55 micrometers over a period of 25 years.

| Operating Conditions | Passivation Conditions | | |
|---|---|---|---|
| Temperature, Partial Pressure $H_2$ | Partial Pressure $D_2$ | Treatment Temperature | Treatment Time |
| 40° C., $P_{H2}$ = 0.001 atm. | 1 atm | 85° C. | 7 days |
| 25° C., $P_{H2}$ = 0.001 atm | 1 atm | 65° C. | 7 days |
| 10° C., $P_{H2}$ = 0.002 atm | 1 atm | 65° C. | 3.5 days |

Figure 2:
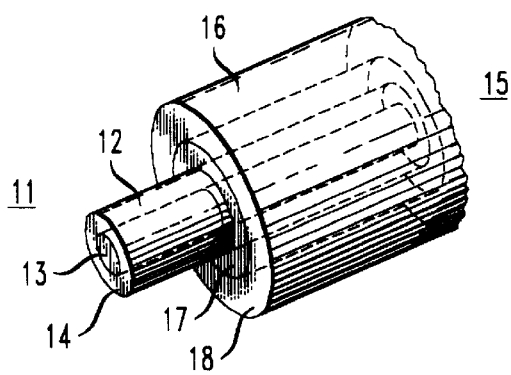
FIG. 2 is a schematic view of a passivated glass optical fiber.

FIG. 2 illustrates a typical transmission fiber, passivated as described above, and shown with a stripped end 11 comprising a glass fiber 12 including a core region 13 surrounded by a cladding region 14. The fiber can be single mode or multimode optical fiber, but is preferably a single mode silica fiber typically having a core diameter on the order of 6–10 μm micrometers and a surrounding cladding a few tens of micrometers thick.

The unstripped fiber 15 comprises a cured polymer coating 16 which is preferably a dual coating comprising a primary (inner) coating 17 and a secondary (outer coating) 18. The polymer coatings can be any one of a variety of polymers including hydrocarbon polymers, polyethers, polycarbonates, polyesters and silicones. The primary coating is advantageously formulated to provide a rubbery texture whereas the secondary coating advantageously has a more highly crosslinked, glassy texture.

When passivated by heating in deuterium as described above, a fiber will be less sensitive to long-term hydrogen induced loss increases that might otherwise occur if the fiber were not passivated. While hydrogen can be used instead of deuterium for passivating the fiber and preventing long-term loss increases, this hydrogen passivation can cause loss increases to occur during the passivation process. This can be seen by reference to FIG. 3 which plots the loss increase Δα with wavelength for both $D_2$-treated fiber (curve 2) and $H_2$-treated fiber (curve 1). As can be seen, the $D_2$ treatment essentially shifts the Δα curve toward the longer-wavelength region, preventing passivation induced loss increases from occurring in the 1.55 and 1.31 micron regions of interest.

Planar waveguide devices tend to be compact thin film devices. Such devices can be treated by heating in a deuterium atmosphere in ovens, typically at temperatures in the range 50° C. to 200° C.

All passivation conditions, both for Er fibers and for transmission fibers, depend on anticipated operating conditions. Increases in any of the system parameters of partial pressure of hydrogen, temperature or operating time will require more aggressive passivation conditions.

II. Hydrogen Passivation

Figure 3:
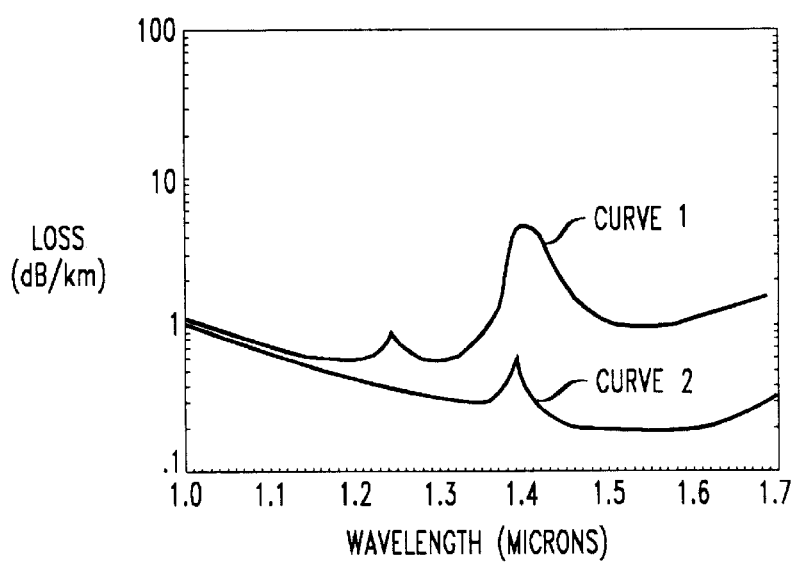
FIG. 3 is a schematic graphical illustration comparing the absorption spectrum of deuterium passivated waveguide with hydrogen passivated waveguide.

As shown in FIG. 3 above, $D_2$ passivation is generally superior to $H_2$ passivation. However, there are some conditions in which $H_2$ can be substituted for $D_2$ in the passivation processes described above. For example, in the fabrication of short length fibers, such as Er amplifier fibers, fiber stability is of primary concern, but not fiber loss. In such instances, $H_2$ can be substituted for $D_2$ and the length of the fiber can be adjusted to account for the loss increases that can occur during the passivation anneal. Similar considerations apply to planar waveguide structures, where the waveguide path is typically short.

III. Theory Underlying Determination of Passivation Conditions

In general it will be possible to passivate a waveguide if the reactive sites have a distribution of activation energies.

The existence of sites that range from being highly reactive to very unreactive suggests that if it is possible to remove the most reactive sites then the device's subsequent reactivity can be reduced to tolerable levels. In the following discussion OH formation will be considered as a typical example of a lossy defect that can affect fiber reliability. The OH overtone is centered at about 1.4 µm in silica fibers and can influence losses at system wavelengths and at the 1.48 µm Er amplifier pumping wavelength. Reactive defects can be eliminated by reacting them with deuterium, which does not cause vibrational losses at system wavelengths. In some cases it may be possible to use $H_2$ to passivate fibers, as long as small passivation induced losses are acceptable.

To understand how to determine appropriate conditions for passivation, first consider defects within the distribution that have a particular activation energy E. Assuming that the rate of $H_2$ reaction at the defect site is proportional to the concentration of unreacted defects of energy E and to the concentration of $H_2$, a simple analysis shows that the concentration of OH formed is given by:

$$C_{OH}(E) = C_{d,o}(E)[1-\exp(-t/\tau(E))] \quad (1)$$

where $C_{d,o}(E)$ is the initial concentration of reactive sites of energy E, and where $\tau(E)$ is a characteristic time constant given by:

$$\tau(E) = \frac{\exp\left(\frac{E}{kT}\right)}{v_o C_{H_2}} \quad (2)$$

where k is Boltzmann's constant, and $V_o$ has the character of a vibrational frequency. $C_{H_2}$ is the molecular hydrogen concentration at the fiber core expressed in ppm. The value of $C_{H_2}$ can be calculated for a given time, temperature and hydrogen pressure based on solubility data for $H_2$ (or $D_2$) in silica by the relation:

$$C_{H_2} = P_{H_2} S_{H_2} \quad (3)$$

$S_{H_2}$ is the solubility for molecular hydrogen in silica, and is readily available in the literature, as well as for deuterium. $P_{H_2}$ is the pressure of $H_2$ around the fiber.

Since there is a distribution of sites having different E's, the total concentration of OH at any time is given by:

$$C_{OH} = \int_{E=0}^{\infty} N_{d,o}(E)\left[1 - \exp\left[\frac{-t}{\tau(E)}\right]\right] dE \approx \int_{E=0}^{E_d} N_{d,o}(E) dE \quad (4)$$

when $N_{d,o}(E)$ is a function that describes the concentration density of reactive sites as a function of energy, and $E_d$ is a "demarcation" energy given by $kT \ln(C_{H_2} v_o t)$. The approximation in the second part of Eq. (4) is based on the fact that defects with very high activation energies, $E > E_d$, will have negligible reactivity and will not contribute significantly to the OH increases - i.e., at high E's the value of $1-\exp(-t/\tau(E))$ is approximately zero. At low E's the expression $1-\exp(-t/\tau(E))$ will approach a value of 1.

In general one will not know a priori the nature of the function $N_{d,o}(E)$ but even so it is apparent that as long as the value of $E_d$ (i.e., $kT \ln(C_{H_2} v_o t)$) is constant one will get the same value for $C_{OH}$.

To passivate a fiber one wishes to pre-react all reactive defects: i.e., those with E's less than some critical value $E_{crit}$. Once one has determined $E_{crit}$ it is possible to specify the required time, $C_{D_2}$, and temperature for passivation based on the following expression:

$$kT_{pass} \ln[v_o C_{D_{2pass}} t_{pass}] = E_{crit} \quad (5)$$

where the pass subscript refers to conditions to be used for passivation. (The time $t_{pass}$ is the time required for the passivation reaction and does not account for the time required to diffuse $D_2$ or $H_2$ from the outside of the fiber to its core, as will be discussed later.)

Figure 4:
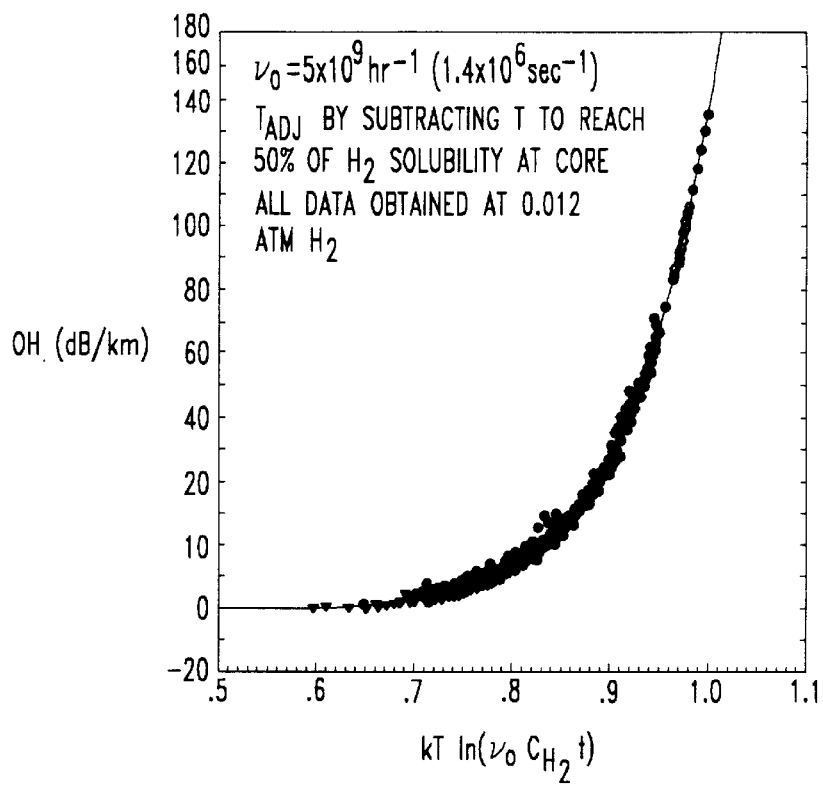
FIGS. 4 and 5 are graphical plots useful in understanding the theory of the invention.
Figure 5:
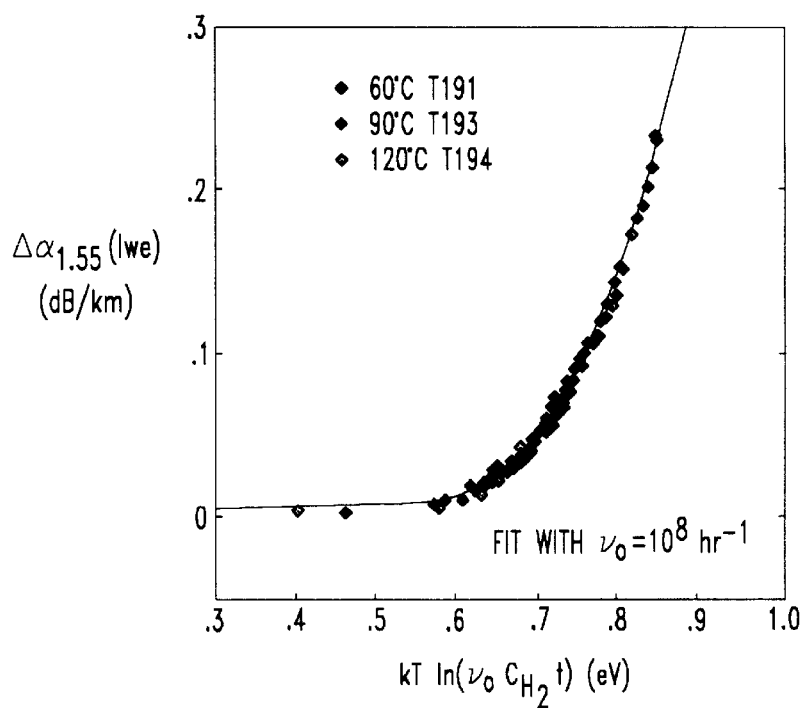

To determine $E_{crit}$ one must rely on experimental data obtained from accelerated testing, where one usually measure loss increases, at some wavelength of interest, in a fiber or waveguide that is exposed to relatively high levels of $H_2$ at elevated temperatures. By plotting $C_{OH}$ versus $kT \ln(C_{H_2} v_o t)$ one can readily generate a "master" curve. $C_{OH}$, T, $C_{H_2}$, and t are all experimentally measured parameters. (For the example of OH loss increases, the concentration, $C_{OH}$, can be determined from the increase in the OH overtone absorption around 1.4 µm.) The value for $v_o$ is found in an iterative manner such that experimental data obtained at different conditions (e.g., different temperatures) all fall on a smooth curve. FIGS. 4 and 5 show such accelerated aging data for a typical Er amplifier fiber and for an alkali containing single mode transmission fiber, respectively. With such a "master" curve in hand it is a simple matter to determine $E_{crit}$. For instance, one can use the "master" curve to determine OH increases as a function of time for the $C_{H_2}$ and temperature that will be characteristic of a real system. By plotting OH versus time it is a simple matter to find the critical time, $t_{crit}$ such that the incremental OH induced loss increase between $t_{crit}$ and $t_{crit} + t_{sys}$ is less than the tolerable OH loss increase dictated by system considerations. The value of $E_{crit}$ is then given by $$E_{crit} = kT_{sys} \ln[v_o C_{H_{2sys}} t_{crit}] \quad (6)$$

Any practical conditions of temperature, time and hydrogen pressure that will satisfy the following equation can be used for passivation.

$$kT_{pass} \ln[v_o C_{D_2} t_{pass}] = E_{crit} \quad (7)$$

Given the temperature and $D_2$ pressure to be used for the passivation, the required passivation time is given by $$t_{pass} = \frac{\exp\left(\frac{E_{crit}}{kT_{pass}}\right)}{v_o S_{D_2} P_{D_{2\,pass}}} \quad (8)$$

It will sometimes be necessary to make small adjustments to the anneal conditions so as to allow sufficient time for the $D_2$ molecules to diffuse to the fiber core. The diffusion time can be roughly estimated as $$t_{diffn} = \frac{0.2a^2}{D_{D_2}} \quad (9)$$

where a is the fiber radius (frequently 62.5 µm for standard optical fibers (and $D_{D_2}$ is the diffusivity of deuterium (or hydrogen) in silica, which is a well characterized value. The total time required for the passivation anneal is then $$t_{anneal} = t_{pass} + t_{diffn} \quad (10)$$

A more exact method to determine the total time needed for the anneal is to solve the following equation for $t_{anneal}$, as shown in Eq. (11). However, for most practical applications Eq. 10 will be somewhat easier to solve and will give a reasonable estimate of the annealing time.

$$kT_{pass}\ln\left(v_o \int_{t=0}^{t_{anneal}} C_{D_2\ pass} dt\right) = E_{crit} \quad (11)$$

As discussed earlier, the maximum temperature to be used for passivation will often be dictated by the thermal degradation of a fiber's polymer coating, while the maximum practical $C_{H_2}$ will be limited by the pressure handling capability of a vessel used to hold the fiber or waveguide during the passivation anneal.

Application of these principles can be understood by consideration of the following examples.

EXAMPLE 1

Er Doped Fiber

For Er doped fiber, FIG. 4 plots OH loss increase at the overtone peak (1.42 $\mu$m) versus kT ln ($v_o C_{H_2} t$). The value of $v_o$ was determined to be $5 \times 10^9 hr^{-1}$. For assumed system conditions of 75° C., 0.01 atm $H_2$, 25 years, and an assumed tolerable 1.55$\mu$m loss increase of 0.1 dB for a 20m fiber length, the value of $E_{crit}$ is determined to be about 1.07 eV. If the passivation temperature is chosen to be 125° C. and the passivation is done in 1 atm of $D_2$ the required time ($t_{pass}$) can be calculated to be about 7.5 days. The diffusion time, $t_{diffn}$, at this temperature is relatively short about 2 hours. The total anneal time is then about 7.6 days.

As shown in Eq. (8), the passivation time can be decreased by increasing the passivation pressure, for instance to 10 atm. $t_{pass}$ is now 0.76 days, and $t_{diffn}$ is unchanged, resulting in a total anneal time of about 0.86 day.

For a system operating at 40° C., $P_H 2 = 0.001$ atm, for 25 years, with a tolerable 1.55 $\mu$m loss increase of 0.1 dB for a 20 m fiber length the value for $E_{crit}$ is found to be 0.76 eV. (This is lower than the 1.07 eV value above due to the less severe system conditions.) Again it is possible to choose any conditions such that Eq. (7) is satisfied. For an anneal temperature of 60° C. and a passivation pressure of 1 atm $D_2$ the required passivation time, $t_{pass}$, is 0.8 hours. The diffusion time, $t_{diffn}$, however is significantly longer, about 20 hours as estimated using Eq. 10, resulting in $t_{anneal}$ of about 21 hours. A more exact estimate of $t_{anneal}$ using Eq. 11 specifies a 14 hour anneal.

As suggested by Eq. (8) if the deuterium pressure for passivation was lowered by a factor of 10, to 0.1 atm, the passivation reaction time would increase by a factor of 10, to 8 hours. The diffusion time as estimated by Eq. (10) is unchanged, resulting in an anneal time of 28 hours.

EXAMPLE 2

Alkali Containing Transmission Fibers

FIG. 5 shows a master curve for alkali containing single mode fibers whose cores contain about 3% $GeO_2$, and with cladding doped with $P_2O_5$ and F. The value of $v_o$ is $10^8 \ hr^{-1}$ for this type of fiber. For system conditions of 40° C., 0.001 atm $H_2$, and a system lifetime of 25 years, and a tolerable loss increase of 0.002 dB/km at 1.55 $\mu$m, the required value of ECt is 0.85 eV. If the passivation is to be done in 1 atm of $D_2$ at a temperature of 85° C., the required time for the reaction, $t_{pass}$, is 6.6 days. The diffusion time, $t_{diffn}$, is 7.5 hours, resulting a total anneal time of about 7 days.

For system conditions of 25° C., 0.001 atm $H_2$, and a system lifetime of 25 years, and a tolerable loss increase of 0.002 dB/km at 1.55 $\mu$m, the required value of $E_{crit}$ is 0.808 eV. If the passivation is to be done in 1 atm of $D_2$ at a temperature of 65° C., the required time for the reaction, $t_{pass}$, is 6.2 days. The diffusion time, $t_{diffn}$, is 16 hours, resulting in a total anneal time of about 7 days.

It is understood that the above-described embodiments are merely illustrative of a few of the many possible specific embodiments which can represent applications of the principles of the invention. Numerous and varied other arrangements can be readily devised in accordance with these principles by those skilled in the art without departing from the spirit and scope of the invention.

What is claimed is:

1. A method of making a glass optical waveguide resistant to hydrogen-induced losses for use in a hydrogen-containing environment comprising the steps of:

forming said glass optical waveguide, said waveguide having sites prone to react with hydrogen ($H_2$) and form hydroxy (OH) radicals; and before said waveguide is used in said hydrogen-containing environment, disposing said waveguide in a deuterium-containing environment containing deuterium at a partial pressure of 10 atmospheres or less and heating said waveguide to a temperature in the range 50° C. to 200° C. for a time so that deutedum occupies a sufficient portion of said sites to inhibit the formation of hydroxy (OH) radicals and render said waveguide resistant to hydrogen-induced losses, such that a 20 m length of said waveguide is calculated to incur over a period of 25 years in said hydrogen-containing environment a loss change of less than 0.1 dB at the 1.55 micrometer wavelength, wherein said step of disposing said waveguide in a deuterium-containing environment to render said waveguide resistant to hydrogen-induced losses is performed in the absence of UV treatment.

2. The method of claim 1, in which the time for disposing said waveguide in a deutehnum-containing environment is less than 12 hours.

3. The method of claim 1, in which the step of disposing said waveguide in a deuterium-containing environment to render said waveguide resistant to hydrogen-induced losses is performed for a time such that said waveguide is calculated to incur over a period of 25 years in said hydrogen-containing environment a loss change of less than 0.04 dB at the 1.55 micrometer wavelength.

4. The method of claim 1, in which the waveguide comprises a $GeO_2$ doped silica waveguide.

5. The method of claim 1, in which the step of disposing said waveguide in a deuterium-containing environment to render said waveguide resistant to hydrogen-induced losses is performed at a temperature of 50 to 140° C.

6. The method of claim 5, in which the step of disposing said waveguide in a deuterium-containing environment is performed for a time such that said waveguide is calculated to incur over a period of 25 years in said hydrogen-containing environment a loss change of less than 0.002 dB at the 1.55 micrometer wavelength.

7. A method of making an optical fiber amplifier resistant to hydrogen-induced losses for use in a hydrogen-containing environment comprising the steps of:

forming said glass optical fiber amplifier, said amplifier having sites prone to react with hydrogen ($H_2$) and form hydroxy (OH) radicals; and before said amplifier is used in said hydrogen-containing environment, disposing said fiber amplifier in a deuterium-containing environment containing deuterium at a partial pressure of atmospheres or less and heating said fiber amplifier to a temperature in the range 50° C. to 140° C. for a time so that deuterium occupies a sufficient portion of said sites to inhibit the formation of hydroxy (OH) radicals and render said waveguide resistant to hydrogen-induced losses, such that a 20 m length of said fiber amplifier is calculated to incur over a period of 25 years in said hydrogen-containing environment a loss change of less than 0.1 dB at the 1.55 micrometer wavelength, wherein said step of disposing said waveguide in a deuterium-containing environment to render said waveguide resistant to hydrogen-induced losses is performed in the absence of UV treatment.

8. A method of making a glass optical waveguide resistant to hydrogen-induced losses for use in a hydrogen-containing environment, the method comprising the steps of:

forming said glass optical waveguide, said waveguide having sites prone to react with hydrogen and form hydroxy radicals; and before said waveguide is used in said hydrogen-containing environment, disposing said waveguide in a deuterium-containing environment containing deuterium at a partial pressure of 10 atmospheres or less and heating said waveguide at a temperature in the range 50° C. to 200° C. for a time period in the range of ten hours to eight days to render said waveguide resistant to hydrogen-induced losses, wherein said step of disposing said waveguide in a deuterium-containing environment to render said waveguide resistant to hydrogen-induced losses is performed in the absence of UV treatment.

9. The method of claim 8, in which the pressure is about 1 atmosphere or less, the temperature is about 140° C. or less, and the time period is in the range from about 12 to 17 hours.

10. A method of making a glass optical waveguide resistant to hydrogen-induced losses for use in a hydrogen-containing environment, the method comprising the steps of:

forming said glass optical waveguide, said waveguide having sites prone to react with hydrogen and form hydroxy radicals; and before said waveguide is used in said hydrogen-containing environment, disposing said waveguide in a deuterium-containing environment containing deuterium at a partial pressure of 10 atmospheres or less and heating said waveguide at a temperature in the range 50° C. to 200° C. for a time period to pre-react said sites and render said waveguide resistant to hydrogen-induced losses, the time period being determined as a function of the vibrational frequency, the temperature, the solubility of molecular deuterium in silica, the pressure of deuterium, Boltzmann's constant, the activation energy of the sites prone to react with hydrogen, the fiber radius, and the diffusivity of deuterium in silica, wherein said step of disposing said waveguide in a deuterium-containing environment to render said waveguide resistant to hydrogen-induced losses is performed in the absence of UV treatment.

* * * * *